US008758105B2

(12) United States Patent
Powell et al.

(10) Patent No.: US 8,758,105 B2
(45) Date of Patent: Jun. 24, 2014

(54) BACCARAT GAME WITH ASSOCIATED WAGERING GAME (75) Inventors: Robin Powell, Las Vegas, NV (US); Francisco Tejeda, Las vegas, NV (US)

(73) Assignee: The Talisman Group, LLC, St. Romuald, Quebec (CA)

( * ) Notice: Subject to any disclaimer, the term of this patent is extended or adjusted under 35 U.S.C. 154(b) by 58 days.

(21) Appl. No.: 13/305,597

(22) Filed: Nov. 28, 2011

(65) Prior Publication Data

US 2012/0135790 A1 May 31, 2012

Related U.S. Application Data (60) Provisional application No. 61/417,346, filed on Nov. 26, 2010.

(51) Int. Cl.
G06F 17/00 (2006.01)

(52) U.S. Cl.
USPC ........... 463/13; 273/274; 273/146; 273/149 R (58) Field of Classification Search
None
See application file for complete search history.

(56) References Cited

U.S. PATENT DOCUMENTS

| | | | | | |
|---|---|---|---|---|---|
| 5,366,228 | A | * | 11/1994 | Kangsanaraks | 273/292 |
| 6,299,171 | B1 | * | 10/2001 | Mollo et al. | 273/292 |
| 6,345,824 | B1 | * | 2/2002 | Selitzky | 273/292 |
| 6,733,012 | B2 | * | 5/2004 | Bui et al. | 273/292 |
| 6,837,494 | B2 | * | 1/2005 | Lee | 273/292 |
| 7,419,160 | B1 | | 9/2008 | D'Ambrosio | |
| 2002/0135130 | A1 | * | 9/2002 | Su | 273/292 |
| 2005/0012273 | A1 | * | 1/2005 | Bruno et al. | 273/292 |
| 2005/0073102 | A1 | * | 4/2005 | Yoseloff et al. | 273/292 |
| 2005/0121854 | A1 | * | 6/2005 | Webb | 273/292 |
| 2005/0288085 | A1 | * | 12/2005 | Schubert et al. | 463/11 |
| 2007/0052175 | A1 | * | 3/2007 | McGurk et al. | 273/292 |
| 2007/0167206 | A1 | * | 7/2007 | Kirkutis | 463/11 |
| 2007/0290444 | A1 | * | 12/2007 | Moses | 273/303 |
| 2008/0169606 | A1 | * | 7/2008 | Smith et al. | 273/292 |
| 2008/0207292 | A1 | * | 8/2008 | Yoshizawa | 463/12 |
| 2008/0230995 | A1 | * | 9/2008 | Snow | 273/303 |
| 2008/0296840 | A1 | * | 12/2008 | Snow | 273/274 |
| 2009/0267301 | A1 | * | 10/2009 | Au-Yeung | 273/292 |
| 2009/0295087 | A1 | * | 12/2009 | Kling et al. | 273/292 |
| 2010/0187759 | A1 | * | 7/2010 | Farrow | 273/292 |
| 2011/0042897 | A1 | * | 2/2011 | Daines | 273/292 |
| 2011/0068536 | A1 | * | 3/2011 | Malamut | 273/274 |
| 2012/0009986 | A1 | * | 1/2012 | Hofstein et al. | 463/12 |

OTHER PUBLICATIONS

International Search Report and Written Opinion mailed Apr. 3, 2012.

* cited by examiner

Primary Examiner — Paul A D'Agostino
(74) Attorney, Agent, or Firm — Howard & Howard Attorneys PLLC (57) ABSTRACT Systems and methods for providing wagering games associated with an underlying game of baccarat which are configured for receiving a wager relating to the associated wagering game; conducting the underlying game of baccarat until a baccarat outcome is achieved according to the rules of the baccarat game, wherein the baccarat outcome includes data relating to a player hand score, a banker hand score, the number of cards in the player hand, and the number of cards in the banker hand; comparing the baccarat outcome data with preset criteria, wherein the preset criteria includes at least a number of playing cards for at least one of the respective player and banker hands, a numerical score for at least one of the respective player or banker hands, and a relationship between the player and banker hands; and providing a payout if the preset criteria is satisfied by the baccarat outcome data.

19 Claims, 4 Drawing Sheets

BACCARAT GAME WITH ASSOCIATED WAGERING GAME

CROSS-REFERENCE TO RELATED APPLICATIONS

This application claims the benefit of U.S. Provisional Patent Application No. 61/417,346 which was filed Nov. 26, 2010, the disclosure of which is incorporated herein by reference.

FIELD OF THE INVENTION

The invention relates generally to systems and methods of modifying, providing and conducting wagering games, and more particularly, multilayered wagering games.

BACKGROUND OF THE INVENTION

Baccarat is a popular game that is oftentimes played in casino environments. It may take the form of a card table game, played with a shoe of cards that is typically an aggregation of several decks of physical playing cards, or it can be simulated as an electronic table game or an online game.

The most commonly known form of baccarat is traditional baccarat, also known as punto banco, North American Baccarat, tableau Baccarat or mini-Baccarat, which are games of chance. Other forms of baccarat are baccarat chemin de fer and baccarat banque, which involve player skill in addition to an element of chance. The wagering outcomes in traditional baccarat are typically those of the "Player" hand winning, the "Banker" hand winning or neither of the said hands winning, thereby resulting in a so-called "Tie", wherein tie bets win. Those skilled in the art of gaming will understand the rules according to which cards or their electronic representations are dealt to gaming participants and the banker in each hand of baccarat, and such skilled persons will also appreciate the various house rules according to which the winning wagers that are placed on the foregoing wagering outcomes are typically paid or allocated as between those gaming participants and the house.

While baccarat is a very popular game, many new games which are quickly rising in popularity provide numerous wagering opportunities, thus increasing player participation and excitement. Consequently, further variations of existing wagering games are always of interest to players and casino operators, and therefore, there is a desire for systems and methods which would increase wagering in the game of baccarat.

SUMMARY OF THE INVENTION

The invention relates generally to systems and methods of modifying, providing and conducting wagering games, and more particularly, multilayered wagering games.

Some embodiments of the invention are directed to a method of providing a wagering game associated with an underlying game having at least a first hand and a second hand, comprising the steps of: receiving a wager relating to the associated wagering game; conducting the underlying game until an underlying game outcome is achieved according to the rules of the underlying game, or receiving underlying game outcome data relating to an instance of conducting the underlying game, wherein the underlying game outcome includes data relating to a first hand rank, a second hand rank, the composition in the first hand, and the composition in the second hand; comparing the underlying game outcome data with preset criteria, wherein the preset criteria includes at least a characteristic relating to the composition of playing cards for at least one of the respective first and second hands, a rank for at least one of the respective first or second hands, and a relationship between the first hand and the second hand; facilitating the provision of, or providing a payout if the preset criteria is satisfied by the underlying game outcome data; and facilitating the collection of, or collecting the wager if the preset criteria is not satisfied by the underlying game outcome data.

In some embodiments of the aforementioned method, the first hand and the second hand compete with one another in the underlying game.

In some embodiments of the aforementioned method, the rank is a numerical score.

In some embodiments of the aforementioned method, the underlying game is baccarat. In such embodiments, the preset criteria may include at least a number of playing cards in the player hand as the characteristic relating to the composition of playing cards for at least one of the respective first and second hands, a numerical score for the player hand as the rank for at least one of the respective first or second hands, and a player hand having a higher numerical score than the banker hand as the relationship between the first hand and the second hand.

In some embodiments of the aforementioned method, the step of conducting the underlying game until an underlying game outcome is achieved further comprises using a program with a random number generator.

In some embodiments of the aforementioned method, the step of conducting the underlying game until an underlying game outcome is achieved further comprises using at least one randomly ordered deck of physical playing cards.

Some embodiments of the invention are directed to a method of providing a wagering game associated with an underlying game of baccarat, comprising the steps of: receiving a wager relating to the associated wagering game; conducting the underlying game of baccarat until a baccarat outcome is achieved according to the rules of the baccarat game, or receiving baccarat outcome data relating to an instance of conducting the baccarat game, wherein the baccarat outcome includes data relating to a player hand score, a banker hand score, the number of cards in the player hand, and the number of cards in the banker hand; comparing the baccarat outcome data with preset criteria, wherein the preset criteria includes at least a number of playing cards for at least one of the respective player and banker hands, a numerical score for at least one of the respective player or banker hands, and a relationship between the player hand and the banker hand; providing a payout if the preset criteria is satisfied by the baccarat outcome data; and collecting the wager if the preset criteria is not satisfied by the baccarat outcome data.

In some embodiments, the aforementioned method further comprises receiving a wager in the baccarat game.

In some embodiments of the aforementioned method, the wagers are received electronically.

In some embodiments of the aforementioned method, the underlying game of baccarat is conducted using physical playing cards drawn from a randomly ordered stock of playing cards.

In some embodiments of the aforementioned method, the preset criteria includes a single number of playing cards in the player hand, a single numerical score for the player hand and a higher player hand score than the banker hand score. For example, the number of playing cards may be 3, and the score may be 8.

Some embodiments of the invention are directed to a system for providing the methods described above.

In some embodiments, the aforementioned system provides an associated wagering game with an underlying game of Baccarat, which includes a device, apparatus or method such as a communication interface for receiving outcome data relating to an instance of conducting the underlying game of baccarat until a baccarat outcome is achieved according to the rules of the baccarat game, wherein the baccarat outcome includes data relating to a player hand score, a banker hand score, the number of cards in the player hand, and the number of cards in the banker hand; a processor configured for comparing the baccarat outcome data with preset criteria, wherein the preset criteria includes at least a number of playing cards for at least one of the respective player and banker hands, a numerical score for at least one of the respective player or banker hands, and a relationship between the player hand and the banker hand. The communication interface may also be configured for (i) receiving a wager relating to the associated wagering game; (ii) indicating that the wager is collected if the preset criteria is not satisfied by the baccarat outcome data; and (iii) providing a payout if the preset criteria is satisfied by the baccarat outcome data.

The information received regarding the underlying game of baccarat may be received upon the game being conducted via a processor or through physical playing cards drawn from a randomly ordered stock of playing cards.

The system may further include a display device configured for displaying the results of the wager in the associated wagering game.

The communication interface may be a data input and/or data output device or a remote computer terminal, such as a home computer or mobile device with access to local or global network. The system and communication interface may be configured for providing the associated wagering game to players via an online system or the Internet. The processor may also be remotely located from the player interface. In some embodiments, the communication interface, processor and display device may be mounted within a unitary housing, and the aforementioned system may be an electronic gaming machine or electronic platform including multiple data input devices providing player positions.

Some embodiments of the invention are directed to a method of providing a wagering game associated with an underlying game having at least a first hand and a second hand, which includes a first event of receiving a wager relating to the associated wagering game; a second event of conducting the underlying game until an underlying game outcome is achieved according to the rules of the underlying game, wherein the underlying game outcome includes data relating to a first hand rank, a second hand rank, the composition of cards in the first hand, and the composition of cards in the second hand; a third event of comparing the underlying game outcome data with preset criteria, wherein the preset criteria includes at least a characteristic relating to the composition of playing cards for at least one of the respective first and second hands, a rank for at least one of the respective first or second hands, and a relationship between the first hand and the second hand; and a fourth event of either providing a payout if the preset criteria is satisfied by the underlying game outcome data or collecting the wager if the preset criteria is not satisfied by the underlying game outcome data.

Some embodiments of the invention are also directed to a non-transitory machine readable media for providing a wagering game associated with an underlying game including one or more software programs, code and/or data segments as necessary to provide any of the methods described herein on one or more machines. For example, the aforementioned machine readable media may include: a code segment configured for receiving a wager relating to the associated wagering game; a code segment configured for receiving baccarat outcome data from an instance of conducting the underlying game of baccarat until a baccarat outcome is achieved according to the rules of the baccarat game, wherein the baccarat outcome includes data relating to a player hand score, a banker hand score, the number of cards in the player hand, and the number of cards in the banker hand; a code segment configured for comparing the baccarat outcome data with preset criteria, wherein the preset criteria includes at least a number of playing cards for at least one of the respective player and banker hands, a numerical score for at least one of the respective player or banker hands, and a relationship between the player hand and the banker hand; a code segment configured for facilitating provision of a payout if the preset criteria is satisfied by the baccarat outcome data; and a code segment configured for facilitating collection of the wager if the preset criteria is not satisfied by the baccarat outcome data. In some embodiments, the aforementioned machine readable media may include software programs, code and/or data segments as necessary to perform any of the methods described herein or to facilitate the installation and operation of such methods in a system as described herein.

DETAILED DESCRIPTION OF THE INVENTION

The exemplary embodiments herein relate to wagering games such as Baccarat or Blackjack or variants and modifications thereof in which additional or side wagers other than the underlying game wagers for such games are placed by players and received by the house or casino, or a person or entity acting as a banker of the game, to be subsequently resolved in a secondary or associated wagering game which is resolved at least in part by the randomly generated outcome of the underlying game.

It should be understood that each of the methods and individual steps recited herein may be partially or wholly carried out in a variety of ways and/or systems, which may include, but are not limited to, a live dealer physically dealing playing cards in a casino, an electronic gaming machine (EGM) for use by one or more players, a multiplayer platform which may include a player interface such as a touchscreen display and involve physical or virtual playing cards, dealer and wagering chips, a home computer or portable computing device, such as a tablet computer or mobile phone capable of communicating with a network or over the Internet, global telecommunication network or world wide web. It should further be understood that the methods and systems of the invention are described herein in connection with a conventional Baccarat game for illustrative purposes only, as the methods and systems of the invention may be employed, combined or integrated with modified, variant or otherwise non-conventional Baccarat games, such as baccarat variants with modified rules, additional wagers or a modified vigorish, including no-commission or commission-free versions of baccarat like the game marketed worldwide by DEQ Systems, Corp. under the brand name EZ Baccarat™, as well as other games, such as Blackjack or Poker and variations thereof.

All references herein that are made to "cards", "decks", "dealing", "hands" or other such expressions that are ordinarily used in describing a wagering game that is played with physical playing cards are also meant to describe and capture all associated electronic and online representations of said physical playing cards, including their associated graphical and numeric card symbols (for instance, suits such as hearts, spades, diamonds or clubs, face cards such as jacks, queens and kings, and the aces and other numbered cards of a typical playing deck). The said expressions are also meant to extend as well to all forms of electronic dealing, distribution or allocation of the said card symbols, according to the rules of the underlying wagering game.

It should further be understood that the invention is directed to, among other things, methods of providing, conducting and resolving multi-layered wagering games that include a sequence of controlled and concrete transformative events. Some of these events may involve wagering and resolving a wager, or the generation and application of random data to predefined rules and determination of a final outcome in a first or underlying game. The generation of random data may be facilitated by computerized and/or physical implements. The transformative events may also include parsing of the data from the underlying game outcome for comparative purposes with preset criteria to determine an outcome in a second or associated wagering game.

Figure 1:
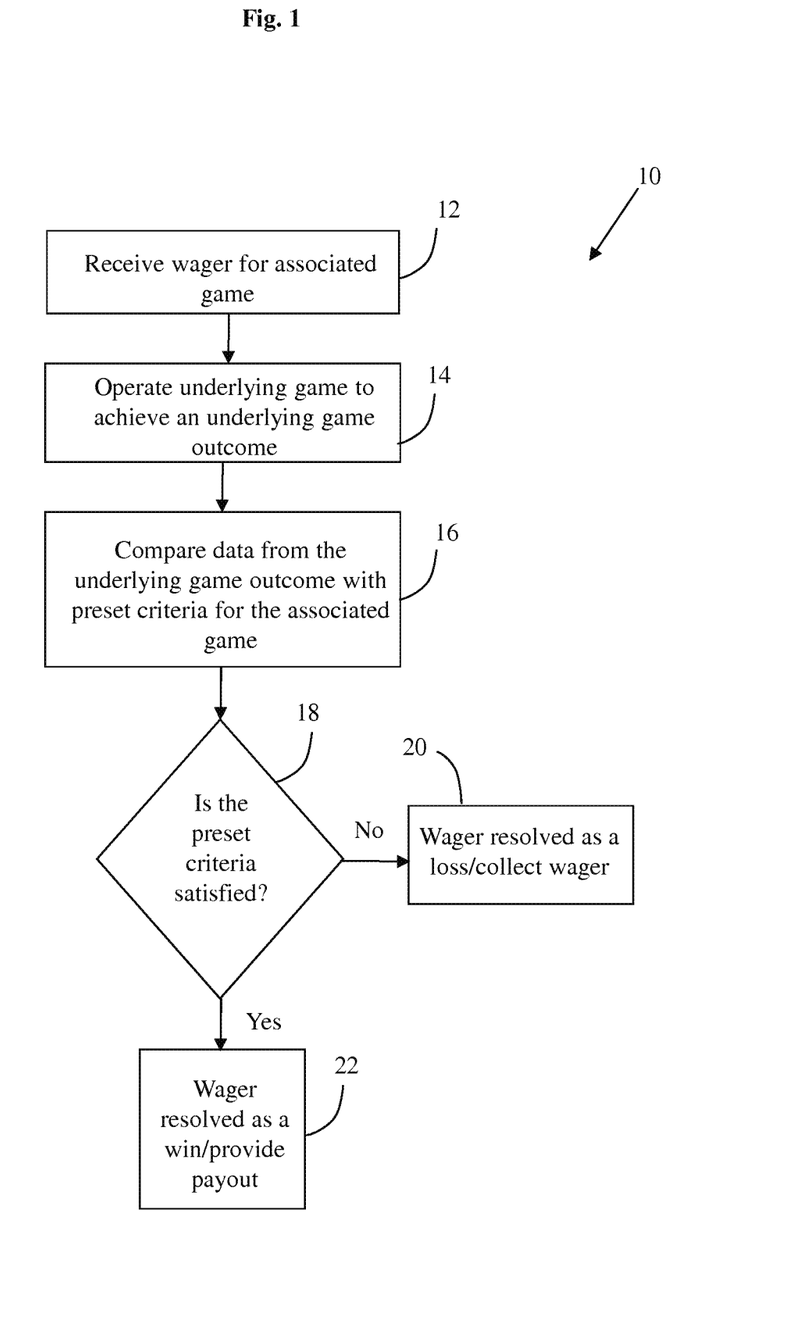
FIG. 1 is a process flow chart depicting an exemplary embodiment of the invention.

A method of conducting a wagering game associated with an underlying game, such as baccarat, according to some embodiments of the invention is generally referred to by the reference numeral 10 in FIG. 1.

In step 12, a wager is received by a player interested in playing the associated game. In this embodiment, the wager is optional, and may be received along with a wager in the underlying game. However, in other embodiments, the wager placed in step 12 may be mandatory, along with a wager received in the underlying game, so that the player must play both the underlying wagering game and associated game.

In step 14, the underlying game is played or operated until an outcome is achieved according to the rules of the underlying game. For example, if the underlying game is baccarat, in this step the baccarat game will be carried out until an outcome is achieved, such as a player hand win, banker hand win or tie. It should be understood the outcome of the underlying game and any date or information relating thereto is considered to be immediately made available or otherwise communicated and received for purposes of illustrating the features of this embodiment and the associated game. It should be further understood that the underlying game and associated game may be conducted at the same or different locations and/or time.

In step 16, data from the underlying game outcome is compared with preset criteria for resolving the wager received in connection with the underlying game in step 12. The outcome of the underlying game obtained in step 14 may be stored in memory or otherwise displayed through physical cards or on a monitor for purposes of conducting the comparison of step 16.

The preset criteria may relate to any information relating to the underlying game outcome, such as one or more characteristics associated with the composition of any or each of the hands in the game, which may include information relating to the playing cards in one or more of the hands (e.g., their individual ranks, suits, numbers, or other features of the cards), the order in which cards were dealt to one or more hands in the underlying game, and/or the number of cards dealt or received in one or more of the hands, that is, to the extent hands in the underlying game will have varying amounts of cards. The preset criteria may also relate to the score or rank of each hand and the relationship between the hands pursuant to the rules of the underlying game.

For example, if the underlying game is baccarat, then the preset criteria may relate to any one or more of a specific hand composition of playing cards in either one or both of the player and banker hands, a specific number of playing cards in either one or both of the player and banker hands, a specific score in either one or both of the player and banker hands, a relationship between the player and banker hands such as the player having a higher score than the banker hand, the banker hand having a higher score than the player hand or the banker hand and player hand having the same score, etc. Alternatively, the preset criteria may relate to ranges of cards or scores, or data associated with a combination of the player and banker hands.

Embodiments of the invention may include one or more preset criteria, each of which may be satisfied by the same or different data obtained from any one underlying game outcome. For example, the preset criteria may relate to multiple specific sequences of cards, wherein each sequence pays a different payout according to its odds of occurring in the underlying game. In another embodiment, first preset criteria may relate to an underlying game outcome wherein a player hand loses, and second preset criteria may relate to the score of the player hand being within a certain range of the score of the winning hand.

It should be readily apparent that the preset criteria may vary and be modified in accordance with the invention and depending on the data obtainable from the underlying game outcome.

As shown by step 18, if the data obtained from the underlying game outcome does not satisfy the preset criteria, then the outcome of the associated game is determined to be a loss and the wager received in step 12 is collected in step 20.

As also shown by step 18, if the data obtained from the underlying game outcome satisfies the preset criteria, then the outcome of the associated game is determined to be a win, the wager received in step 12 is resolved as such and a payout is provided in step 22. The payout in step 22 may be anything of value, such as a fixed amount, a multiple of the wager received in step 12, an odds-based payout, all or a portion of an incremented progressive award or a prize.

Figure 2:
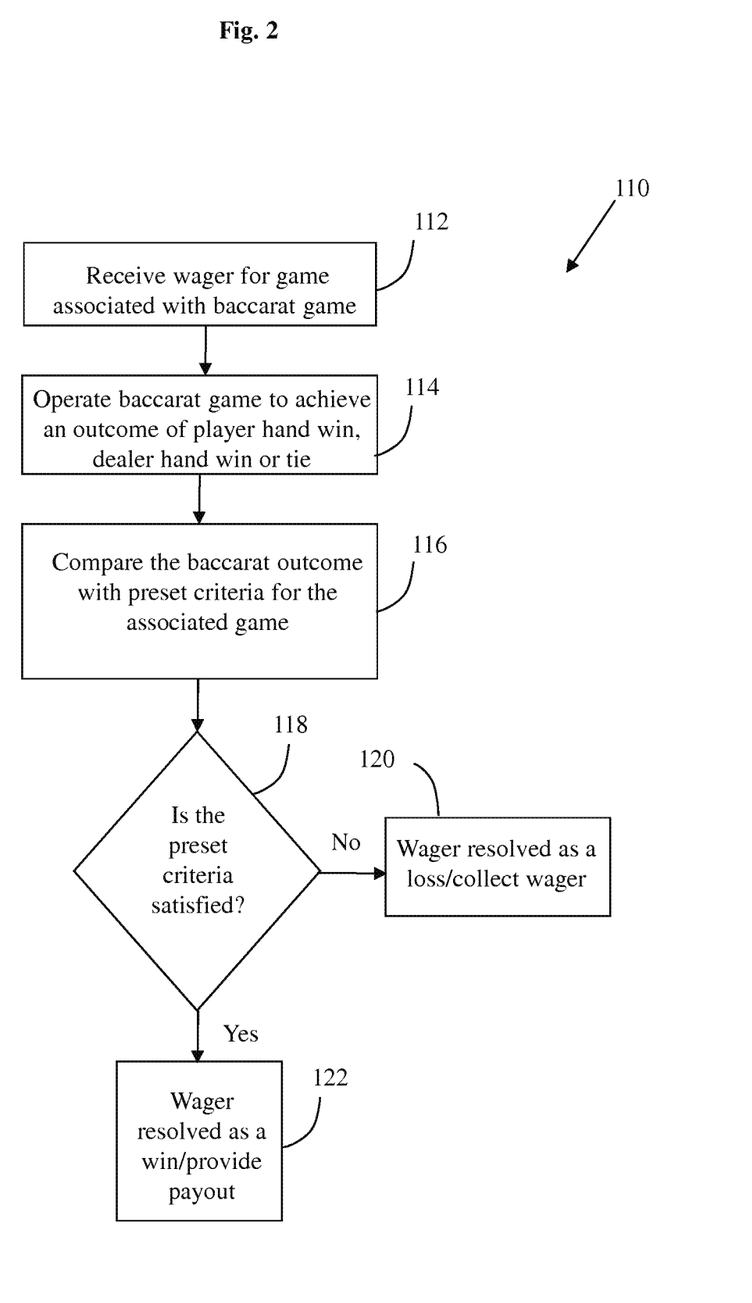
FIG. 2 is process flow chart depicting another exemplary embodiment of the invention.

In another embodiment of the invention shown in FIG. 2, a method 110 involves the underlying game of baccarat. In step 112, a wager is received in connection with the present embodiment associated with the baccarat game. In some embodiments, a baccarat wager must also be received by each player wagering on the associated game in step 112, while in other embodiments, wagers may be received for the associated game in step 112 from players that have not also placed a wager in the baccarat game.

In step 114, the baccarat game is carried out according to its rules, which will result in the formation of a player hand and a dealer hand through the delivery of random playing cards, which may be physically dealt from a shoe containing a stock of randomized cards or virtually supplied via a program using a random number generator. The baccarat game is played until an outcome is achieved which will be one of a player hand win, a banker hand win or a tie, and any baccarat wagers received may be resolved accordingly.

In step 116, the baccarat outcome is compared with the preset criteria for the associated game. As a non-limiting example, the preset criteria may be baccarat outcomes with a player hand having a specific amount of playing cards, a specific player hand score and a relationship between the player and banker hand of the player hand having a higher score than the banker hand. To further illustrate this non-limiting example, the preset criteria may be baccarat outcomes with a player hand including three cards, a player hand score of eight and a relationship between the banker hand and player hand of the player hand having a higher score than the banker hand, that is, a player win.

As shown by steps 118 and 120, if the preset criteria is not satisfied by the baccarat outcome, then the wager received in step 112 is resolved as a loss and collected.

As also shown by step 118, if the preset criteria is satisfied by the baccarat outcome, then the wager received in step 112 is resolved as a win and a payout is provided in step 122. The payout in step 122 may be an odds payout.

An exemplary table of preset criteria and payouts corresponding to the amount wagered in step 112 is shown below for illustrative purposes, and are not necessarily odds based payouts.

TABLE 1

| Preset Criteria Satisfied by Baccarat Game Outcome | Payout |
| --- | --- |
| Player hand having three cards, banker hand has three cards and banker hand has a score which is one less than the score of the player hand | 15:1 |
| Banker hand is dealt a two, three and four in sequence and player hand and banker hand have the same score | 50:1 |
| Player hand has three cards, the cards are all the same rank, and the player hand has a lower score than the banker hand | 40:1 |
| Banker hand has three cards, player hand has two cards, and the player hand and banker hand have the same score | Push |
| Player hand has three cards, player hand has a score of eight and player hand has a higher score than banker hand | 25:1 |
| Banker hand has three cards, player hand has two cards, and the player hand and banker hand has higher score than player hand | 1:2 |
| Player hand has three cards, banker hand has three cards, and the player hand and banker hand combined score is 9 | 10:1 |

For example, if a wager $10 is received in step 112 and the baccarat outcome is a player hand with three cards and a score of three, while the banker hand has three cards and a score of four, then a payout of $150 would be made in step 122.

Other tables of exemplary preset criteria which may be used in connection with the embodiments of the inventions are shown below in the form of a paytable. Thus, a payout may be made if a wager is received in the associated game and any of the preset criteria listed below are satisfied by the baccarat outcome. It should be understood that any one or more of the preset criteria may be employed in any of the methods as described herein or other methods in accordance with the invention, and that payouts may be adjusted depending on the one or more preset criteria employed to, among other things, provide a desirable house advantage.

TABLE 2

Preset Criteria Satisfied by Baccarat Game Outcome

| Banker hand having three cards, banker hand has a higher score than the player hand, and banker hand score is: | Payout (to one unit wager) |
| --- | --- |
| 1 | 150 |
| 2 | 100 |
| 3 | 70 |
| 4 | 70 |
| 5 | 0 |
| 6 | 0 |
| 7 | 40 |
| 8 | 30 |
| 9 | 25 |

TABLE 3

Preset Criteria Satisfied by Baccarat Game Outcome

| Player hand having three cards, player hand has a higher score than the banker hand, and player hand score is: | Payout (to one unit wager) |
| --- | --- |
| 1 | 150 |
| 2 | 100 |
| 3 | 70 |
| 4 | 50 |
| 5 | 0 |
| 6 | 0 |
| 7 | 30 |
| 8 | 25 |
| 9 | 25 |

It should be readily apparent that many variations of the preset criteria and payouts may be advantageously employed in embodiments of the invention.

In another exemplary embodiment, there is provided a method of wagering on elected outcomes of a Baccarat game, the method comprising the steps of: (a) receiving an election of at least one wagering choice for an ensuing round of the Baccarat game, the wagering choice being a primary end-of-round outcome of the Baccarat game selected from one of a player hand winning, a banker hand winning and a tying hand winning, in combination with at least one other outcome of the Baccarat game that is not a primary end-of-round outcome; (b) allocating playing cards from a predetermined inventory of playing cards to a designated player hand and to a designated banker hand, according to predetermined Baccarat allocation rules; (c) scoring each of the designated player and banker hands, according to predetermined Baccarat scoring rules, in order to determine which of the primary end-of-round outcomes has occurred; (d) determining whether the at least one other outcome of the Baccarat game has occurred; and (d) paying the gaming participant on the occurrence of each elected wagering choice, if any has occurred in combination in accordance with the said steps (c) and (d), based on the probability of occurrence of each elected wagering choice.

In yet another exemplary embodiment, there is provided a method of wagering on elected outcomes of a Baccarat game, the method comprising the steps of: (a) receiving an election at least one wagering choice for an ensuing round of the Baccarat game, the wagering choice being selected from a group of outcomes consisting of a player hand winning and a banker hand winning, in combination with a total number of playing cards respectively associated with a said winning hand; (b) allocating playing cards from a predetermined inventory of playing cards to a designated player hand and to a designated banker hand, according to predetermined Baccarat allocation rules; (c) scoring each of the designated player and banker hands, according to predetermined Baccarat scoring rules in order to determine if the designated player hand has won or the designated banker hand has won, corresponding respectively to the outcomes consisting of the player hand winning and the banker hand winning; (d) determining the total number of playing cards associated with the said winning hand in the event of occurrence of the said outcomes consisting of one of the playing hand winning and the banker hand winning; and (d) paying the gaming participant on the occurrence of each elected wagering choice, based on the probability of occurrence of each elected wagering choice.

In yet another exemplary embodiment, there is provided a method of wagering on elected outcomes of a Baccarat game, the method comprising the steps of: (a) inviting a gaming participant of the Baccarat game to elect at least one wagering choice for an ensuing round of the Baccarat game, the wagering choice being selected from a group of outcomes consisting of a player hand winning and a banker hand winning, in combination with a scoring value respectively associated with a said winning hand; (b) allocating playing cards from a predetermined inventory of playing cards to a designated player hand and to a designated banker hand, according to predetermined Baccarat allocation rules; (c) scoring each of the designated player and banker hands, according to predetermined Baccarat scoring rules in order to determine if the designated player hand has won or the designated banker hand has won, corresponding respectively to the outcomes consisting of the player hand winning and the banker had winning according to a scoring value obtained from said scoring rules; and (d) paying the gaming participant on the occurrence of each elected wagering choice, based on the probability of occurrence of each elected wagering choice.

Some embodiments of the invention provide additional options to gaming participants for the placement of supplemental wagers on a traditional Baccarat game and its variants or derivatives, whether in respect of a Baccarat card table game, an electronic Baccarat table game or an online Baccarat game, thereby promoting the interest and excitement of gaming participants and producing the possibility of increased winnings for such gaming participants and added gaming revenues for the house, casino or other gaming entity that is sponsoring or holding the Baccarat game.

According to some illustrative embodiments of the invention, gaming participants in a Baccarat game such as traditional Baccarat will be provided with the opportunity to wager in addition to or instead of the known wagering outcomes of "Player", "Banker" and "Tie", which supplemental wagering options include a selection of the winner of the ensuing hand, namely either "Player" or "Banker", together and in conjunction with a selection of the total number of cards in the winning hand as well as the final scoring total of the winning hand. Illustratively, each individual wager may be paid at odds according to the probability of occurrence of the selected combination of results, based on the starting shoe or deck from which a hand or hands have been dealt to the gaming participants.

In this illustrative embodiment, the foregoing tables illustrate preset criteria which may be satisfied by a baccarat game outcome from a dealing of cards to the "Player" and "Banker" hands based on an initial deal of two cards each, whereupon the "tableau" or table of play according to the rules of traditional Baccarat will determine if further cards are to be drawn. Such rules of play are well known to those of skill in this art. Also as will be known to those of skill in this art, once a hand is completed, a scoring total will be determined according to the rules of traditional Baccarat, with a modulo 10 function being applied to the raw scoring sum obtained from the known card values of the respective hands in order to produce the single-digit scoring total of the foregoing table of outcomes.

According to another illustrative embodiment of the present invention, a supplemental wagering option may take the form of the added selection of a "Tie" outcome to the outcomes of "Banker" winning or "Player" winning, together and in conjunction with a selection of the total number of cards in each of the tied "Banker" and "Player" hands as well as the final scoring total of the tied hand. Once again, each individual wager may be paid at odds according to the probability of occurrence of the selected combination of results, based on the starting shoe or deck from which a hand or hands have been dealt to the gaming participants.

In a further illustrative embodiment of the invention, "Tie" wagering combinations may stand alone as a supplemental wagering option, without the option to select one or more of the "Banker" winning or "Player" winning combinations previously described.

In a still further illustrative embodiment of the present invention, the supplemental wagering option may take the form of providing the gaming participant with the selection of the winner of the ensuing hand, namely either "Player" or "Banker", together and in conjunction with a selection of the total number of cards in the winning hand but without further specifying the final scoring total of the winning hand. As per the previous illustrative embodiments, each individual wager may be paid at odds according to the probability of occurrence of the selected combination of results, based on the starting shoe or deck from which a hand or hands have been dealt to the gaming participants.

In a yet further embodiment of the present invention, the supplemental wagering option may take the form of the added selection of a "Tie" outcome to the outcomes of "Banker" winning or "Player" winning, together and in conjunction with a selection of the total number of cards in each of the tied "Banker" and "Player" hands but without further specifying the final scoring totals of the tying hand. Yet again, each individual wager may be paid at odds according to the probability of occurrence of the selected combination of results, based on the starting shoe or deck from which a hand or hands have been dealt to the gaming participants.

In a still further illustrative embodiment of the present invention, the supplemental wagering option may take the form of providing the gaming participant with the selection of the winner of the ensuing hand, namely either "Player" or "Banker", together and in conjunction with a selection of the final scoring total of the winning hand, but without further specifying the total number of cards in the winning hand. Yet again, each individual wager may be paid at odds according to the probability of occurrence of the selected results, based on the starting shoe or deck from which a hand or hands have been dealt to the gaming participants.

According to still other illustrative embodiments of the present invention, a supplemental wagering option may take the form of the added selection of a "Tie" outcome to the outcomes of "Banker" winning or "Player" winning, together and in conjunction with a selection of the final scoring value of the tied hand. Once again, each individual wager may be paid at odds according to the probability of occurrence of the selected result, based on the starting shoe or deck from which a hand or hands have been dealt to the gaming participants.

As known to those of skill in the art of gaming, when the various illustrative embodiments of the present invention are implemented in conjunction with a Baccarat table game utilizing physical playing cards and money or wagering pieces or chips representative of the actual dollar value of a wager, the foregoing outcome-tables may be reproduced and positioned as a grid marking on the physical playing surface in association which the Baccarat table game is played, such that gaming participants may place their bets at designated wagering times according to the supplemental wagering options as described above by resting their money, wagering pieces or chips in the desired area of the grid that denotes their selected supplemental wagering option or options.

Alternatively, the supplemental wagering options according to the present invention may be implemented and presented by means of computer program code which, by way of example, when executed by a processor, causes the display of the supplemental wagering options and permits a gaming participant to select same such as by means of a touch screen or other input facility during play of the Baccarat table card game. According to the foregoing alternative, the display of the software program may be achieved by means of a visual display monitor provided on, in or adjacent the physical playing surface in association with which the Baccarat table card game is played. If in conjunction with an Baccarat electronic table game or a Baccarat online game, the supplemental wagering options according to the present invention may be incorporated as computer program code either in or with the computer program code of the underlying electronic table game or online game, as the case may be, or instead as separate computer program code which, by way of example, when executed by a processor, causes the display of the supplemental wagering options and permits a gaming participant to select same such as by means of a touch screen or other input facility during execution of the Baccarat electronic table game or online game, as the case may be.

Figure 3:
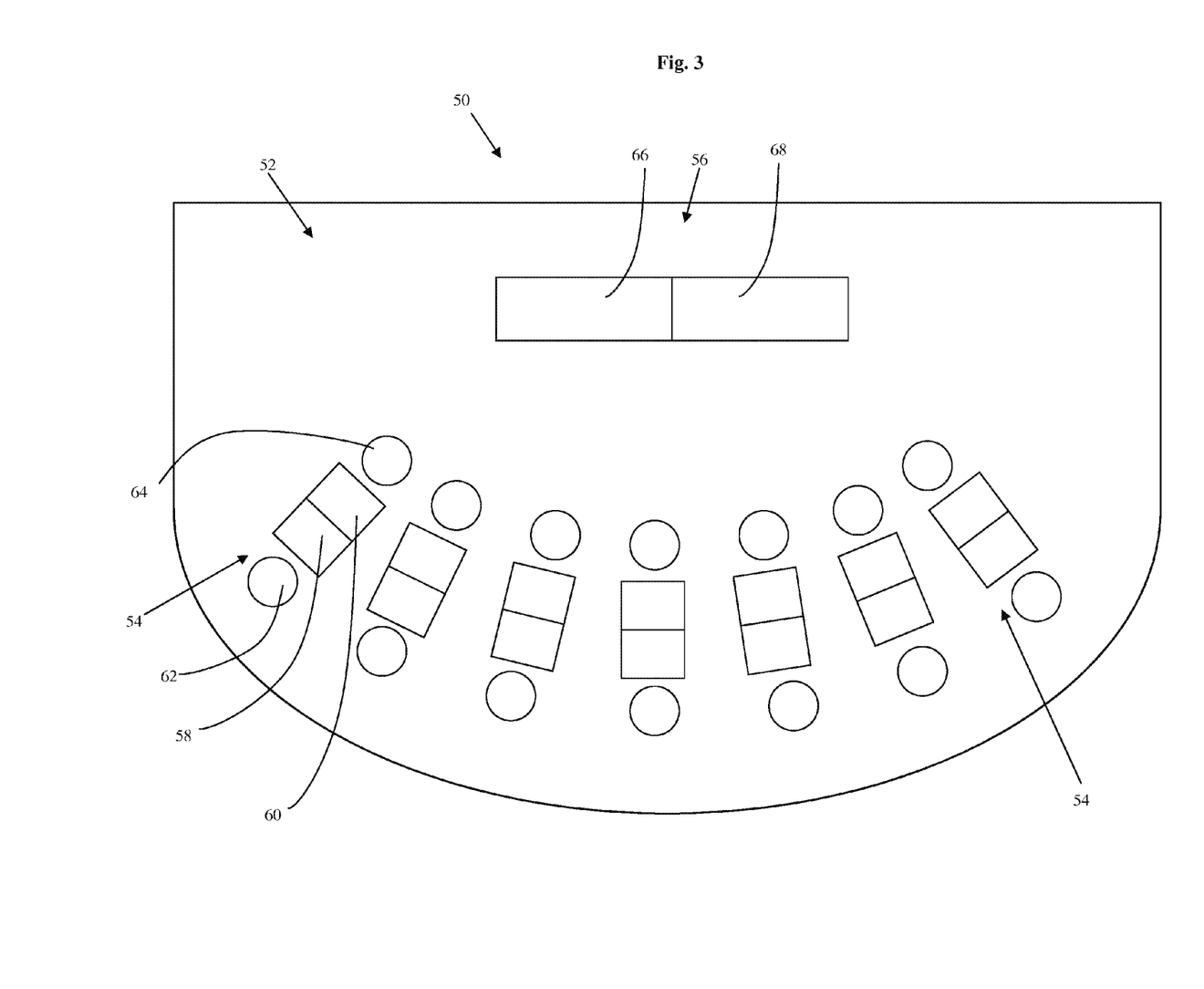
FIG. 3 is a schematic diagram of an exemplary table layout configured for use with methods according to some embodiments of the invention, including physical or live table systems and virtual or partially virtual electronic platforms.

FIG. 3 illustrates an exemplary system 50 configured for operating in accordance with embodiments of the invention. System 50 includes a layout 52 for use in facilitating the presentment and display of a method of the invention such as method 10 or 110. Layout 52 may be a physical or virtual representation of a felt table display, as it should be understood that the methods of the invention would function as described herein if any one or more of the layout, cards, dealers or wagering chips or apparatus were virtually or physically represented. System 50 further includes multiple player positions or interfaces 54 accessible on layout 52 and a dealer position or interface 56. In this embodiment, the underlying game is baccarat, thus each player position 54 includes a player hand wagering position 58, a banker hand wagering position 60, a tie wagering position 62 and an associated game wagering position 64. Dealer position 56 includes a player hand card position 66 and a banker hand card position 68 for forming the respective player and banker hands. It should be understood that player interface 56 may further include a device for electronically receiving wagering credit, placing wagers and distributing payouts as described in this embodiment and in accordance with the invention.

Figure 4:
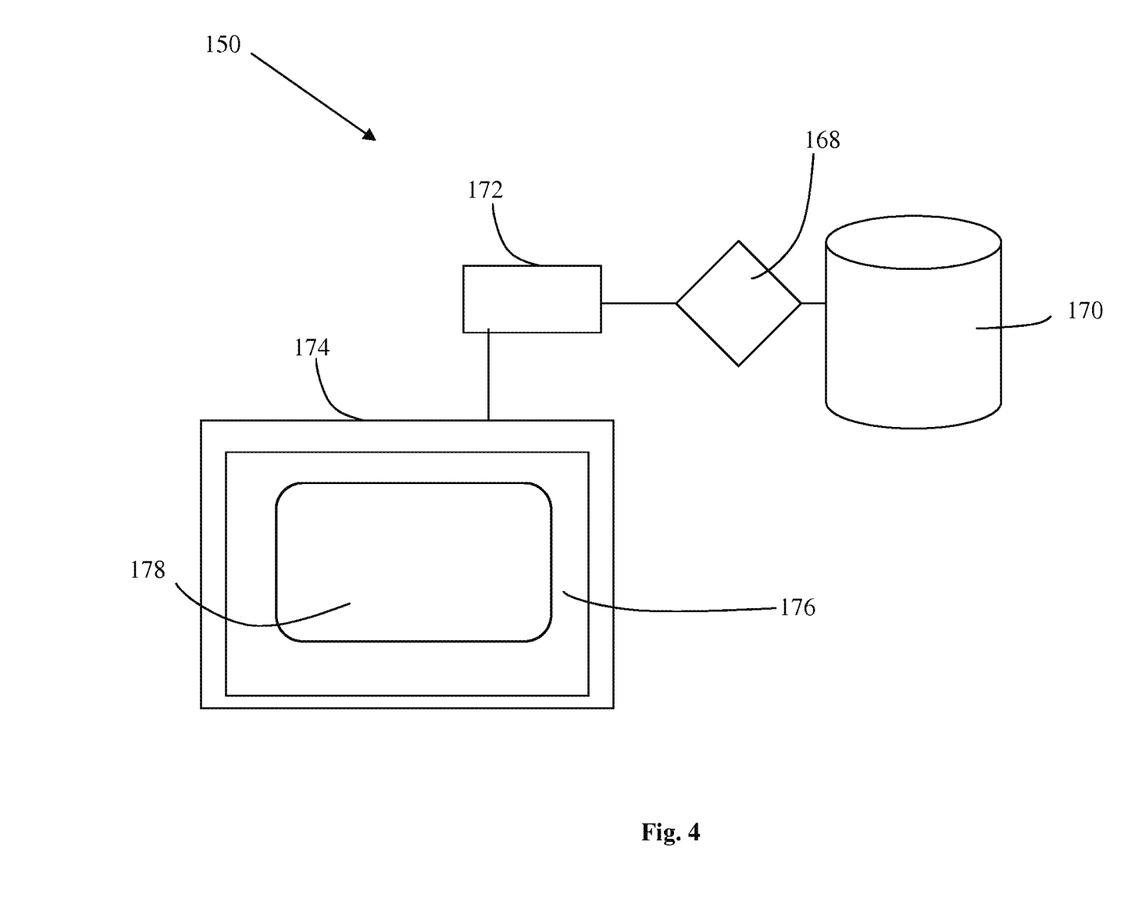
FIG. 4 is a schematic diagram of exemplary system components configured for use with methods according to some embodiments of the invention.

FIG. 4 illustrates an exemplary system 150 constructed in accordance with some embodiments of the invention. System 150 includes processing device 168 in communication with a database or memory device 170, communication or data input/output device 172 and a display device 174. In some embodiments, display device 174 is a touch-enabled device and includes a data input device component. Memory device 170 may include data relating to the underlying game and embodiments of the invention as described herein, such as the preset criteria. A player position 176 is displayed on display device 174 along with virtual representation of a layout and wagering area 178 for transmitting wagers in accordance with any of the embodiments herein, such as method 10. Game outcomes are displayed and wagers are tracked using display device 174 and processing device 168 compares the underlying game outcome with the preset criteria, storing information relating to the satisfaction of the preset criteria in memory 170. Processing device 168 compares the preset criteria with the underlying game outcome stored in memory 170. Should the preset criteria be satisfied, a payout will be determined by processing device 168 and indicated on display device 174. If the preset criteria are not satisfied, the same is indicated on display device 174.

Those skilled in the art will readily appreciate that the methods described herein may be incorporated in a system in accordance with the invention using virtual representations of Baccarat table layouts. The system of the invention may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the methods of the invention so long as players and operators thereof are provided with useful access thereto.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

What is claimed is:

1. A method of providing a wagering game associated with an underlying game of baccarat at an computerized gaming table having one or more processors, one or more player interfaces and a communication interface for receiving data from the one or more interfaces, the method comprising the steps of:
   a) receiving a wager relating to the associated wagering game communicated to the communication interface from a player interface of the one or more of the player interfaces;
   b) the communication interface receiving baccarat outcome data from an instance of conducting the underlying game of baccarat in which playing cards are dealt to a single player hand and a single banker hand, respectively, until the single player hand and single banker hand are in a final condition and an outcome in the underlying game of baccarat is achieved, wherein the baccarat outcome includes data relating to the final condition of the single player hand and the single banker hand involved in the underlying game of baccarat, including a player hand numerical score, a banker hand numerical score, a number representing the amount of cards in the final player hand, and a number representing the amount of cards in the final banker hand;
   c) responsive to receiving the baccarat outcome data, a processor facilitating a comparison of the baccarat outcome data with preset criteria, wherein the preset criteria identifies at least a specific number representing the amount of playing cards which must be in at least one of the respective final player and banker hands, a specific numerical score for at least one of the respective final player and banker hands, and a specific relationship between the final player hand numerical score and the final banker hand numerical score defined by any of the baccarat outcome data received;

d) facilitating the provision of a payout through the player interface from which the wager is received if the preset criteria is satisfied by the baccarat outcome data; and e) facilitating the collection of the wager if the preset criteria is not satisfied by the baccarat outcome data.

2. The method as recited in claim 1, further comprising the communication interface receiving a wager in the baccarat game from the player interface.

3. The method as recited in claim 1, wherein the step of facilitating the provision of a payout further comprises displaying an amount won on the player interface.

4. The method as recited in claim 1, wherein the underlying game of baccarat is conducted using physical playing cards drawn from a randomly ordered stock of playing cards.

5. The method as recited in claim 1, wherein the preset criteria includes a single number of playing cards in the player hand, a single numerical score for the player hand and a player hand score which is greater than the banker hand score but less than the highest score possible in baccarat.

6. The method as recited in claim 5, wherein the number of playing cards is 3.

7. The method as recited in claim 5, wherein the score is 8.

8. A system for providing a wagering game associated with an underlying game of Baccarat, comprising:

a) a processor configured for comparing baccarat outcome data with preset criteria, wherein the preset criteria identifies at least a specific number of playing cards for at least one of the respective final player and banker hands, a specific numerical score for the final player hand, and a relationship between the numerical scores of the final player hand and the final banker hand, wherein the relationship sets forth that the final banker hand must be at least one number less than the final player hand; and b) a communication interface configured for:

(i) receiving a wager relating to the associated wagering game;

(ii) receiving baccarat outcome data relating to an instance of conducting the underlying game of baccarat in which playing cards are dealt to a single player hand and a single banker hand, respectively, until the single player hand and single banker hand are in a final condition and an outcome in the underlying game of baccarat is achieved, wherein the baccarat outcome includes data relating to the only player hand and the only banker hand involved in the underlying game of baccarat, including a player hand score, a banker hand score, the number of cards in the player hand, and the number of cards in the banker hand, wherein the number of cards in the player hand may be the same or different than the number of cards in the banker hand;

(iii) transmitting a notification that the wager is collected if the preset criteria is not satisfied by the baccarat outcome data; and (iv) facilitating a payout if the preset criteria is satisfied by the baccarat outcome data.

9. The system as recited in claim 8, wherein a processor conducts the underlying game of baccarat until a baccarat outcome is achieved according to the rules of the baccarat game.

10. The system as recited in claim 8, wherein means for conducting the underlying game of baccarat until a baccarat outcome is achieved according to the rules of the baccarat game is physical playing cards drawn from a randomly ordered stock of playing cards.

11. The system as recited in claim 8, further comprising a display configured for displaying the results of the wager in the associated wagering game.

12. The system as recited in claim 8, wherein the communication interface and processor are mounted in a unitary housing.

13. The system according to claim 8, wherein the processor is remotely located from the communication interface.

14. A method of providing a wagering game associated with an underlying game of baccarat to one or more players accessing a networked system through one or more player interfaces, wherein the system includes memory, at least one processor and a communication interface for communicating with the one or more player interfaces, the method comprising the steps of:

a) receiving a wager relating to the associated wagering game communicated to the communication interface from a player interface of the one or more of the player interfaces;

b) the communication interface receiving baccarat outcome data from an instance of conducting the underlying game of baccarat in which playing cards are dealt to a single player hand and a single banker hand, respectively, until the single player hand and single banker hand are in a final condition and an outcome in the underlying game of baccarat is achieved, wherein the baccarat outcome includes data relating to the final condition of the single player hand and the single banker hand involved in the underlying game of baccarat, including a player hand score, a banker hand score, the number of cards in the player hand, and the number of cards in the banker hand, wherein the number of cards in the player hand may be the same or different than the number of cards in the banker hand;

c) responsive to receiving the baccarat outcome data, a processor facilitating the comparison of the baccarat outcome data with preset criteria stored in memory, wherein the preset criteria includes at least a specific number of playing cards for the final player hand, a specific numerical score for the final player hand, and a relationship between the numerical score of the final player hand and the numerical score of the final banker hand wherein the numerical score of the final player hand is at least one number greater than the numerical score of the final banker hand;

d) facilitating the provision of a payout through the player interface from which the wager is received if the preset criteria is satisfied by the baccarat outcome data; and e) facilitating the collection of the wager if the preset criteria is not satisfied by the baccarat outcome data.

15. The method as recited in claim 14, wherein the step of receiving a wager further comprises communicating with the communication interface through a global communication network.

16. The method as recited in claim 14, further comprising the step of randomly generating baccarat outcome data facilitated by a random number generator and communicating the baccarat outcome data to the communication interface.

17. The method as recited in claim 14, wherein the communication interface receives baccarat outcome data transmitted from an instance of conducting play of the underlying game of baccarat at a remote location.

18. The method as recited in claim 14, further comprising the step of displaying the payout on a display device associated with the player interface.

19. A method of providing a wagering game associated with an underlying game of baccarat to one or more players accessing a networked system through one or more player interfaces, wherein the system includes memory, at least one processor and a communication interface for communicating with the one or more player interfaces, the method comprising the steps of:
   a) receiving a wager relating to the associated wagering game communicated to the communication interface from a player interface of the one or more of the player interfaces;
   b) the communication interface receiving baccarat outcome data from an instance of conducting the underlying game of baccarat in which playing cards are dealt to a single player hand and a single banker hand, respectively, until the single player hand and single banker hand are in a final condition and an outcome in the underlying game of baccarat is achieved, wherein the baccarat outcome includes data relating to the final condition of the single player hand and the single banker hand involved in the underlying game of baccarat, including a player hand numerical score, a banker hand numerical score, and a number representing the amount of cards in the final player hand;
   c) responsive to receiving the baccarat outcome data, a processor facilitating a determination of whether the baccarat outcome data satisfies preset criteria identifying the number representing the amount of cards in the final player hand as being three, the final player hand numerical score as being eight and the final banker hand numerical score as being between seven and zero;
   d) facilitating the provision of a payout through the player interface from which the wager is received if the baccarat outcome data satisfies the preset criteria; and
   e) facilitating the collection of the wager if the preset criteria is not satisfied by the baccarat outcome data.

* * * * *